H. H. KENNEDY.
VEHICLE BATTERY BOX CONSTRUCTION.
APPLICATION FILED AUG. 12, 1912.
1,067,256.
Patented July 15, 1913.
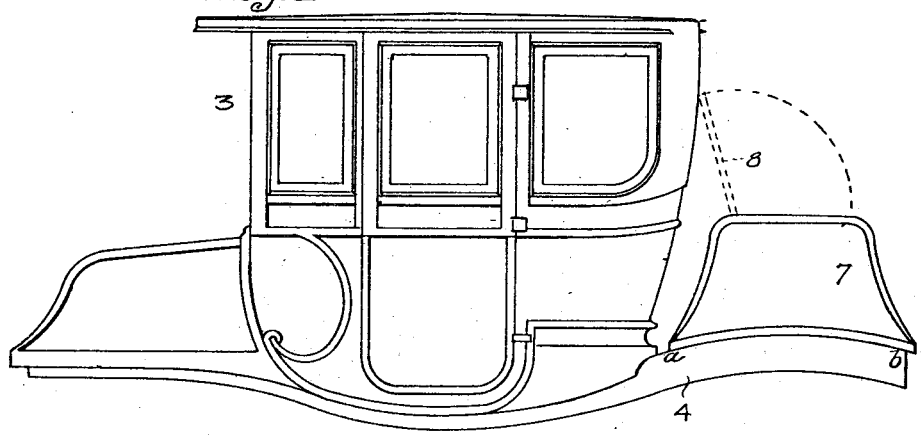
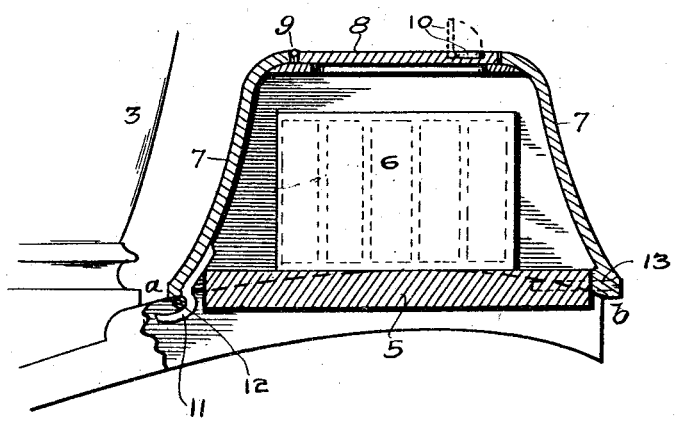
Witnesses;
L. B. Worner
J. H. Swap
Inventor,
Harold H. Kennedy.
By Minturn & Worner
Attorneys.

UNITED STATES PATENT OFFICE.

HAROLD H. KENNEDY, OF INDIANAPOLIS, INDIANA, ASSIGNOR TO THE WAVERLY COMPANY, OF INDIANAPOLIS, INDIANA, A CORPORATION OF INDIANA.

VEHICLE BATTERY-BOX CONSTRUCTION.

1,067,256.    Specification of Letters Patent.    Patented July 15, 1913.

Application filed August 12, 1912. Serial No. 714,717.

*To all whom it may concern:*

Be it known that I, HAROLD H. KENNEDY, a citizen of the United States, residing at Indianapolis, in the county of Marion and State of Indiana, have invented certain new and useful Improvements in Vehicle Battery-Box Construction, of which the following is a specification.

In electrically driven passenger vehicles the battery box is an essential part of the structure, and the general tendency among builders has been to conceal the battery box under a seat, or to locate it at front or rear of the body with access through the body-interior, so that there is constant danger of injury to the upholstering and body finish from the electrolyte used in the batteries, and with closed vehicles the interior is frequently filled with noxious and disagreeable odors from the same source. In addition, the batteries so located are inconvenient of access for the purposes of cleaning, renewal, adjustment and the other frequent attentions which they require.

The object of this invention is to completely divorce the battery from the body of an electric vehicle so there will be no possibility of injury or of disagreeable odors occurring from the battery electrolyte, as above mentioned, and a further object of the invention is to provide a battery cover, the four sides and top of which may readily be lifted off as a whole to permit access to the battery from all directions, and also to provide a top cover or door which will permit of access from above for such minor attentions as do not necessitate the removal of the entire closure.

I accomplish the objects of my invention by the means illustrated in the accompanying drawing, in which—

Figure 1 is a view in side elevation of an electric vehicle body embodying my invention, and Fig. 2 is a fragment of same showing the rear battery box in longitudinal vertical section.

Like characters of reference indicate like parts in the two views of the drawing.

Referring to Fig. 1, 3 represents the body of a closed vehicle of any desired and suitable design, and 4 the main supporting frame upon which it is mounted.

The battery box to which my invention is particularly directed is mounted on a continuation of the frame 4 at the rear of the body 3, and comprises a suitable bottom or base 5 to support the batteries 6, and a removable hood 7 which is separable from the frame 4 on the line *a—b*. The hood 7 will preferably have its four substantially vertical sides made continuous and without openings, but its top will preferably have an opening coextensive with the major portion of its area, which will be closed by a door or lid 8. This door may be hinged as at 9, adapting it to be swung outwardly, as shown by dotted lines in Fig. 1, or it may be a removable lid. It will preferably have a finger plate 10 adapted to afford an easy hold in opening and closing it. The hood 7 will be secured to the frame 4 by any suitable means. The means here shown is by hooks 11 adapted to be passed under a rod 12, or other suitable fastening carried by the frame 4, and the outer opposite edge of the hood may be secured to the base by means of a removable bolt 13, as shown by dotted lines in Fig. 2, or by any other approved fastener.

It will be observed that the hood 7 is entirely separated from the body 3 by a considerable air gap which insures that neither electrolyte nor odors from the battery 6 can injuriously affect the interior of the body or the passengers therein. By unfastening and lifting off the entire hood, which is readily done, the battery 6 is rendered accessible from all directions, and for minor attentions access to the battery is readily provided through the top opening of the hood closed by the door 8.

While I have shown a rear battery box detached from the main body of the vehicle, it is obvious that same may be located either in front of or to the rear of the body 3 and I therefore do not desire to be limited to either location.

What I claim as new and wish to secure by Letters Patent of the United States, is—

1. In an electrically driven vehicle, a main frame, a closed body mounted on said frame, a battery-supporting platform remote from the body and supported by said frame, and a hood forming a closure for the battery on all sides and top, said hood being separate from the body and removable from the platform.

2. In an electrically driven vehicle, a main frame, a closed body mounted on said frame, a battery-supporting platform remote from the body and supported by said frame, a hood forming a closure for the battery on all sides and top, said hood being separate from the body and removable from the battery, and means for removably securing the hood on the platform.

3. In an electrically driven vehicle, a main frame, a closed body mounted on said frame, a battery-supporting platform remote from the body and supported by said frame, a hood forming a closure for the battery on all sides and top, said hood being separate from the body and removable from the platform, and a door in the top of the hood.

In witness whereof, I, have hereunto set my hand and seal at Indianapolis, Indiana, this 19th day of July, A. D. one thousand nine hundred and twelve.

HAROLD H. KENNEDY. [L. S.]

Witnesses:
F. W. WOERNER,
J. A. MINTURN.

the body and supported by said frame, a hood forming a closure for the battery on all sides and top, said hood being separate from the body and removable from the battery, and means for removably securing the hood on the platform.

3. In an electrically driven vehicle, a main frame, a closed body mounted on said frame, a battery-supporting platform remote from the body and supported by said frame, a hood forming a closure for the battery on all sides and top, said hood being separate from the body and removable from the platform, and a door in the top of the hood.

In witness whereof, I, have hereunto set my hand and seal at Indianapolis, Indiana, this 19th day of July, A. D. one thousand nine hundred and twelve.

HAROLD H. KENNEDY. [L. S.]

Witnesses:
F. W. WOERNER,
J. A. MINTURN.

---

It is hereby certified that the name of the assignee in Letters Patent No 1,067,256, granted July 15, 1913, upon the application of Harold H. Kennedy, of Indianapolis, Indiana, for an improvement in "Vehicle Battery-Box Construction," was erroneously written and printed "The Waverly Company," whereas said name should have been written and printed *The Waverley Company;* and that the said Letters Patent should be read with this correction therein that the same may conform to the record of the case in the Patent Office.

Signed and sealed this 19th day of August, A. D., 1913.

[SEAL.]

THOMAS EWING,
*Commissioner of Patents.*

Correction in Letters Patent No. 1,067,256.

It is hereby certified that the name of the assignee in Letters Patent No. 1,067,256, granted July 15, 1913, upon the application of Harold H. Kennedy, of Indianapolis, Indiana, for an improvement in "Vehicle Battery-Box Construction," was erroneously written and printed "The Waverly Company," whereas said name should have been written and printed *The Waverley Company;* and that the said Letters Patent should be read with this correction therein that the same may conform to the record of the case in the Patent Office.

Signed and sealed this 19th day of August, A. D., 1913.

[SEAL.]

THOMAS EWING,
*Commissioner of Patents.*